(12) United States Patent
Ribarov (10) Patent No.: US 11,448,130 B2
(45) Date of Patent: Sep. 20, 2022

(54) MULTIPLE STREAM HEAT EXCHANGER

(71) Applicant: United Technologies Corporation, Farmington, CT (US)

(72) Inventor: Lubomir A. Ribarov, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 92 days.

(21) Appl. No.: 16/843,313

(22) Filed: Apr. 8, 2020

(65) Prior Publication Data
US 2020/0332715 A1    Oct. 22, 2020

Related U.S. Application Data

(60) Provisional application No. 62/835,051, filed on Apr. 17, 2019.

(51) Int. Cl.
*F02C 7/14*        (2006.01)
*F02C 7/16*        (2006.01)
*F28D 9/00*        (2006.01)
*B64D 37/34*       (2006.01)
(Continued)

(52) U.S. Cl.
CPC .................. *F02C 7/14* (2013.01); *F02C 7/16* (2013.01); *F28D 9/0093* (2013.01); *B64D 37/34* (2013.01);
(Continued)

(58) Field of Classification Search
CPC ...... F02C 7/12; F02C 7/14; F02C 7/16; F02C 7/224; F28D 9/0093; F28D 2021/0021;
(Continued)

(56) References Cited

U.S. PATENT DOCUMENTS 4,696,156 A * 9/1987 Burr ........................ F02C 7/14
60/39.08
5,964,280 A * 10/1999 Wehrmann .............. F28D 9/005
165/140
(Continued)

FOREIGN PATENT DOCUMENTS

EP        3249334 A1     11/2017

OTHER PUBLICATIONS

European Search Report for European Application No. 20167244.1 dated Sep. 14, 2020.

*Primary Examiner* — Craig Kim
(74) *Attorney, Agent, or Firm* — Carlson, Gaskey & Olds, P.C.

(57) ABSTRACT

A thermal management system for a gas turbine engine includes a heat exchanger including a first coolant passage for a first coolant medium and a second coolant passage for a second coolant medium that is different than the first coolant medium. A first hot flow passage is in thermal communication with the first coolant passage. A second hot flow passage is in thermal communication with the second coolant passage all within a common housing. A first valve controls a flow of a hot medium into at least one of the first hot flow passage or the second hot flow passage. A controller configured to operate the first valve to direct the flow of hot medium into one of the first hot flow passage and the second hot flow passage for transferring thermal energy from the flow of hot medium into one of the first coolant medium and the second coolant medium.

16 Claims, 3 Drawing Sheets

(51) Int. Cl.
*F02C 7/224* (2006.01)
*F28D 21/00* (2006.01)

(52) U.S. Cl.
CPC ........ *F02C 7/224* (2013.01); *F05D 2260/213* (2013.01); *F05D 2260/98* (2013.01); *F28D 2021/0021* (2013.01)

(58) Field of Classification Search
CPC .................... B64D 37/34; F05D 2260/213; F05D 2260/98
See application file for complete search history.

(56) References Cited

U.S. PATENT DOCUMENTS

| | | | |
|---|---|---|---|
| 6,415,595 B1 | 7/2002 | Wilmot, Jr. et al. | |
| 11,047,266 B2 * | 6/2021 | Bairley | F28F 9/0132 |
| 11,067,003 B2 * | 7/2021 | Stevenson | H02K 5/20 |
| 2007/0267000 A1 * | 11/2007 | Raduenz | F02M 26/32 |
| | | | 123/568.12 |
| 2009/0159246 A1 * | 6/2009 | Cornet | F01D 25/08 |
| | | | 165/138 |
| 2010/0107603 A1 | 5/2010 | Smith | |
| 2010/0186943 A1 | 7/2010 | Sun et al. | |
| 2016/0265438 A1 | 9/2016 | Keeler et al. | |
| 2017/0029132 A1 | 2/2017 | Beier et al. | |
| 2017/0184028 A1 * | 6/2017 | Sennoun | F02C 7/12 |
| 2017/0336149 A1 * | 11/2017 | Ribarov | F28D 9/0093 |
| 2018/0038657 A1 | 2/2018 | Pal | |
| 2018/0170569 A1 | 6/2018 | Brodeur | |
| 2018/0356158 A1 | 12/2018 | Kusuda et al. | |
| 2019/0101057 A1 * | 4/2019 | Stevenson | F02C 6/206 |
| 2019/0218971 A1 * | 7/2019 | Niergarth | F02C 7/185 |

* cited by examiner

MULTIPLE STREAM HEAT EXCHANGER

CROSS-REFERENCE TO RELATED APPLICATIONS

This application claims priority to U.S. Provisional Application No. 62/835,051 which was filed on Apr. 17, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Lubricant that is utilized for bearing and gear systems that support operation of the engine is maintained within predefined temperature ranges by cooling said lubricant in heat exchangers. Heat exchangers utilize fuel and/or air to extract thermal energy from the lubricant. The use of fuel and air as cooling media is limited both by structural and thermal limits. Fuel degrades above certain predefined temperatures and therefore limits the amount of thermal energy that can be extracted by the fuel. Ambient air during flight at elevated altitudes is very cold and therefore can produce large thermal gradients with the hot lubricant within heat exchangers. The large thermal gradients between the hot lubricant flow and the very cold air generate significant challenges in the structure of heat exchangers.

Turbine engine manufacturers continue to seek further improvements to engine performance including improvements to thermal transfer efficiencies.

SUMMARY

A thermal management system for a gas turbine engine according to an exemplary embodiment of this disclosure includes, among other possible things, a heat exchanger which includes a first coolant passage for a first coolant medium and a second coolant passage for a second coolant medium that is different than the first coolant medium. A first hot flow passage is in thermal communication with the first coolant passage and a second hot flow passage is in thermal communication with the second coolant passage all defined within a common housing. A first valve controls a flow of a hot medium into at least one of the first hot flow passage or the second hot flow passage. A controller is configured to operate the first valve to direct the flow of hot medium into one of the first hot flow passage and the second hot flow passage for transferring thermal energy from the flow of hot medium into one of the first coolant medium and the second coolant medium.

In a further embodiment of the foregoing thermal management system for a gas turbine engine, a flow of the first coolant medium and a flow of the second cooling medium is counter to a flow of the hot medium in either the first hot flow passage and the second hot flow passage.

In a further embodiment of any of the foregoing thermal management systems for a gas turbine engine, a bypass passage is included for routing the hot medium around the heat exchanger. The first valve controls the flow of the hot medium through the bypass passage.

In a further embodiment of any of the foregoing thermal management systems for a gas turbine engine, a first temperature sensor communicates information indicative of a temperature of the hot medium before entering the heat exchanger to the controller. The controller operates the first valve to rout a flow of the hot medium to at least one of the first hot flow passage, the second hot flow passage and the bypass passage depending upon a temperature of the flow of hot medium.

In a further embodiment of any of the foregoing thermal management systems for a gas turbine engine, a first coolant temperature sensor communicates information indicative of a temperature of the first coolant medium to the controller and a second coolant temperature sensor communicates information indicative of a temperature of the second coolant medium to the controller. The controller operates the first valve to route the hot medium to a corresponding one of the first coolant passage and the second coolant passage and the bypass passage based on the received information indicative of the temperature of the first coolant medium and the second coolant medium.

In a further embodiment of any of the foregoing thermal management systems for a gas turbine engine, the first coolant passage, the second coolant passage, the first hot flow passage and the second hot flow passage are defined in plates that are stackable to alternate the first coolant passage with the first hot flow passage and the second coolant passage with the second hot flow passage.

In a further embodiment of any of the foregoing thermal management systems for a gas turbine engine, each of the plates includes internal fins to aid in thermal exchange between the first coolant medium, the second coolant medium and the hot medium.

In a further embodiment of any of the foregoing thermal management systems for a gas turbine engine, the first coolant medium comprises a hydraulic fluid, the second coolant medium comprises a fuel and the hot medium comprises a lubricant.

In a further embodiment of any of the foregoing thermal management systems for a gas turbine engine, a secondary cooler cools a second lubricant for an integrated drive generator with lubricant cooled in the heat exchanger.

A gas turbine engine according to an exemplary embodiment of this disclosure includes, among other possible things, a fan disposed within a nacelle, and a core engine disposed within a core cowling. A bypass passage for a fan air stream is defined radially between the nacelle and the core cowl. A thermal management system maintains lubricant for components of the core engine within a defined temperature range. The thermal management system includes a heat exchanger mounted within the core cowling adjacent the bypass passage. The heat exchanger includes a first coolant passage for a hydraulic fluid flow, a second coolant passage for a fuel flow, a first flow passage in thermal communication with the first coolant passage and a second flow passage in thermal communication with the second coolant passage all defined within a common housing. A first valve controls a flow of lubricant into at least one of the first flow passage or the second flow passage. A controller is configured to operate the first valve to direct the flow of lubricant into one of the first flow passage and the second flow passage for transferring thermal energy from the lubricant into one of the hydraulic fluid flow and the fuel flow.

In a further embodiment of the foregoing gas turbine engine, a bypass passage routes the lubricant around the heat exchanger and the first valve controls the flow of the lubricant through the bypass passage.

In a further embodiment of any of the foregoing gas turbine engines, a first temperature sensor communicates information indicative of a temperature of the lubricant before entering the heat exchanger to the controller. The controller operates the first valve to route the flow of the lubricant to at least one of the first flow passage, the second flow passage and the bypass passage depending upon a temperature of the flow of lubricant.

In a further embodiment of any of the foregoing thermal management systems for a gas turbine engine, a hydraulic fluid temperature sensor communicates information indicative of a temperature of the hydraulic fluid flow and a fuel temperature sensor communicates information indicative of a temperature of the fuel to the controller. The controller operates the first valve to route the lubricant to a corresponding one of the first coolant passage, the second coolant passage and the bypass passage based on the received information indicative of the temperature of the hydraulic fluid flow and the fuel flow to control a temperature of the lubricant.

In a further embodiment of any of the foregoing thermal management systems for a gas turbine engine, the first coolant passage, the second coolant passage, the first flow passage and the second flow passage are defined in plates that are stackable to alternate the first coolant passage with the first flow passage and the second coolant passage with the second flow passage.

In a further embodiment of any of the foregoing thermal management systems for a gas turbine engine, each of the plates includes internal fins to aid in thermal exchange between the hydraulic fluid, the fuel and the lubricant.

In a further embodiment of any of the foregoing thermal management systems for a gas turbine engine, a secondary cooler cools a second lubricant for an integrated drive generator with the lubricant cooled in the heat exchanger.

A method of managing thermal properties of a lubricant flow for a gas turbine engine includes, among other possible things, assembling a heat exchanger to include a first coolant passage for a hydraulic fluid flow and a second coolant passage for a fuel flow. A first flow passage is in thermal communication with the first coolant passage and a second flow passage is in thermal communication with the second coolant passage all defined within a common housing. A temperature is measured of the hydraulic fluid flow, the fuel flow and the lubricant flow with at least one sensor assembly and communicated the measured temperature information to a controller. At least one valve is operated to rout lubricant flow into thermal communication with one of the hydraulic fluid flow in the first coolant passage and fuel flow in the second coolant passages to maintain the lubricant flow within a predefined temperature range.

In a further embodiment of the foregoing method of managing thermal properties of a lubricant flow for a gas turbine engine, at least one valve proportionally routes the lubricant flow into each of the first coolant passage and the second coolant passage depending on the measured temperature of the hydraulic fluid flow, the fuel flow and the lubricant flow.

In a further embodiment of any of the foregoing methods of managing thermal properties of a lubricant flow for a gas turbine engine, a portion of lubricant flow exiting the heat exchanger is routed to a secondary cooler for cooling a second lubricant low for an integrated drive generator.

In a further embodiment of any of the foregoing methods of managing thermal properties of a lubricant flow for a gas turbine engine, the heat exchanger is assembled into a core cowling adjacent a fan air stream bypass passage.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
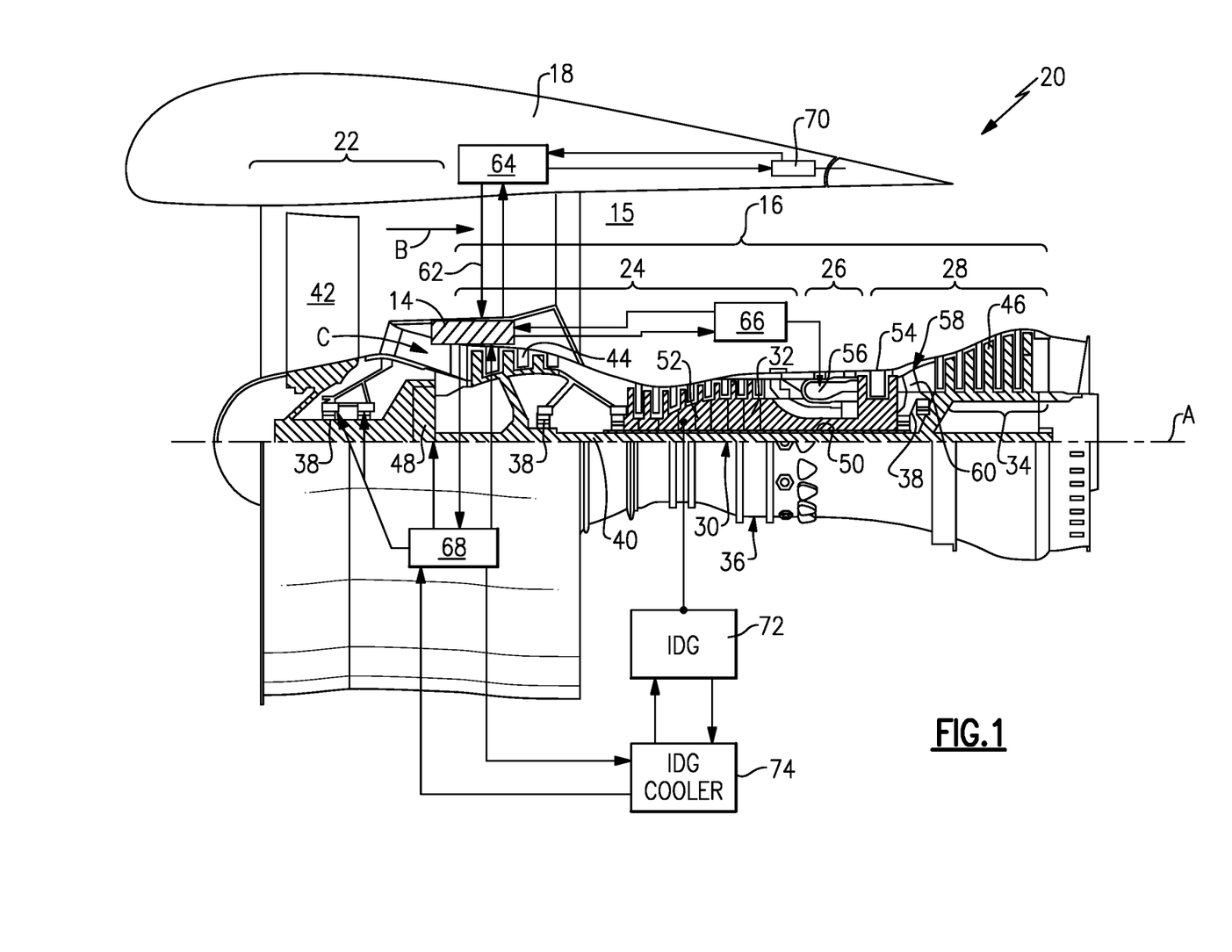
FIG. 1 is a schematic view of an example gas turbine engine.

FIG. 1 schematically illustrates a gas turbine engine 20 for powering an aircraft. The gas turbine engine 20 is disclosed herein as a two-spool turbofan that generally incorporates a fan section 22 and a core engine section 16. The core engine section 16 includes a compressor section 24, a combustor section 26 and a turbine section 28 disposed within a core cowling 14. The fan section 22 drives air along a bypass flow path B in a bypass duct 15 defined radially between the core cowling 14 and a nacelle 18. The fan section 22 also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion of the combustion gases. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6:1), with an example embodiment being greater than about ten (10:1), the geared architecture 48 is an epicyclic gear train, such as a planetary gear system or other gear system, with a gear reduction ratio of greater than about 2.3 and the low pressure turbine 46 has a pressure ratio that is greater than about five (5:1). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about (1.45:1). "Low corrected fan tip speed" is the actual fan tip speed in ft/sec divided by an industry standard temperature correction of $[(Tram\ ^{\circ}R)/(518.7^{\circ}R)]^{0.5}$. The "Low corrected fan tip speed" as disclosed herein according to one non-limiting embodiment is less than about 1150 ft/s (350.5 m/s).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 5 turbine rotors schematically indicated at 34. In another disclosed embodiment, the low pressure turbine includes about 6 rotors. In another non-limiting example embodiment, the low pressure turbine 46 includes about 3 turbine rotors. In yet another disclosed embodiment, the number of turbine rotors for the low pressure turbine 46 may be between 3 and 6. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A lubricant system schematically shown at 68 provides a lubricant flow to components of the core engine 16 including the geared architecture 48 and the various bearing systems 38. Moreover, it should be appreciated that the lubricant system 68 may provide lubricant flow to other components of the core engine 16 and fan section 22. The lubricant provides lubrication and also cooling of the various bearing systems 38 and the geared architecture 48. The lubricant will accumulate thermal energy that requires cooling to maintain the lubricant within a predefined temperature range. The example engine 20 further includes a thermal management system schematically shown at 62. The thermal management system 62 utilizes other flows as a heat sink to maintain the lubricant within the defined temperature ranges.

A fuel system 66 provides fuel to the combustor 56 to generate the high energy exhaust gas flow that drives the turbine section 28. Fuel flow is utilized by the thermal management system 62 as a heat sink to absorb thermal energy from the lubricant. The engine 20 further includes a hydraulic system that is schematically shown at 64. The hydraulic system 64 provides fluid to power actuators such as the actuator 70 for moving a control surface. The hydraulic system 64 may also power other devices and systems that are part of the engine 20. The hydraulic system 64 provides a hydraulic fluid flow to the thermal management system 62 along with fuel flow from the fuel system 66.

Fuel will degrade at certain known temperatures and is therefore limited in the amount of heat that can be accepted. Hydraulic fluid has similar properties to the lubricant but has a viscosity much lower than that of the lubricant. The lower viscosity enables the hydraulic fluid to be exposed to lower temperatures without performance degradation. Moreover, the hydraulic fluid is utilized in actuators and reservoirs that are exposed to ambient conditions during aircraft operation that provide increased possibilities for accepting and dissipating thermal energy. The example thermal management system 62 utilizes both fuel and hydraulic fluid in combination to manage heat loads on the lubricant.

Figure 2:
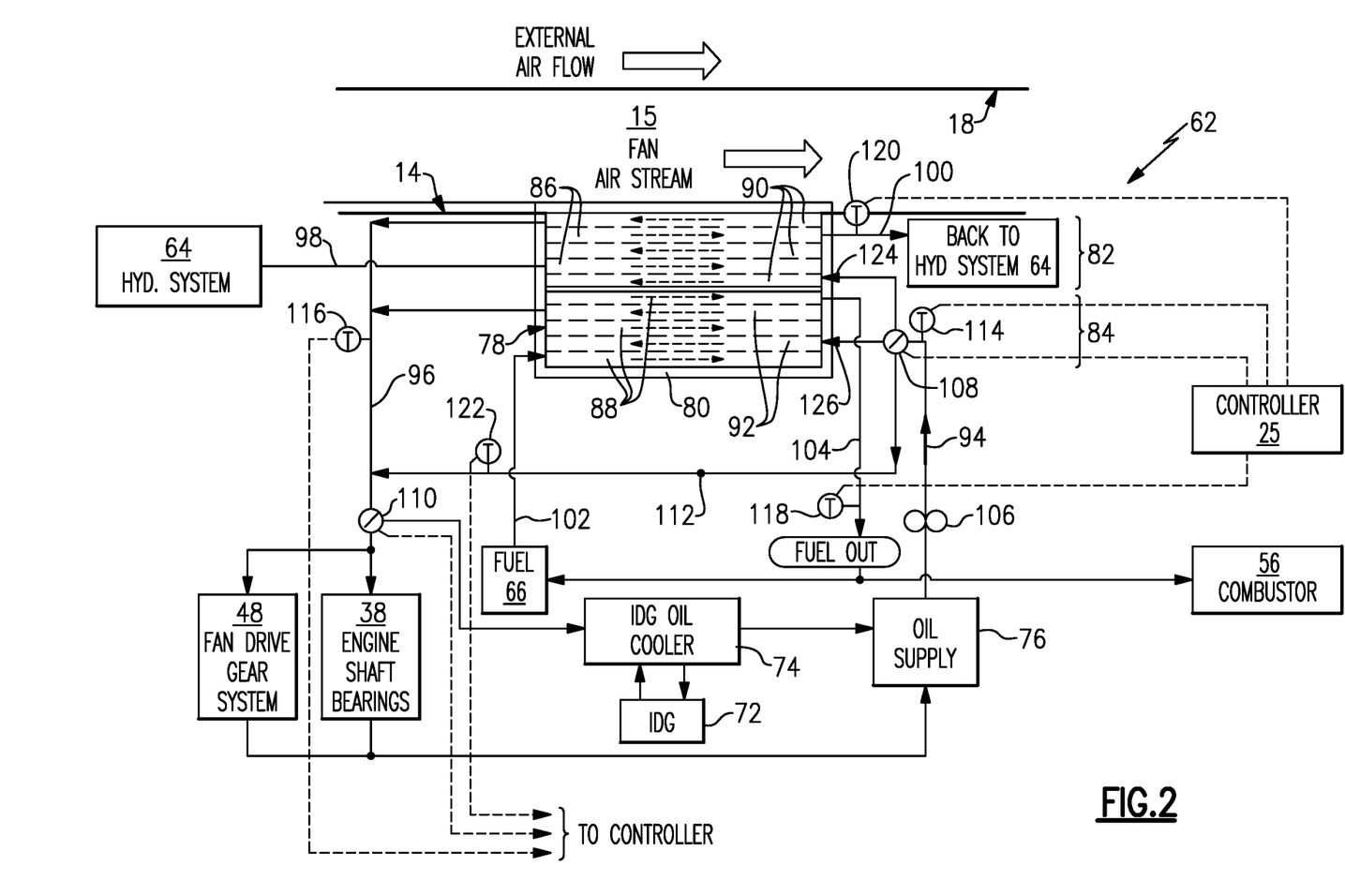
FIG. 2 is a schematic view of an example thermal management system embodiment.

Referring to FIG. 2, with continued reference to FIG. 1, the example thermal management system 62 is show schematically and includes a multi-stream heat exchanger 78 that is mounted within the core engine section 16 adjacent the core cowling 14 and the bypass flow duct 15. Accordingly, the heat exchanger 78 is disposed adjacent a fan air stream through the bypass flow duct 15.

The example heat exchanger 78 is a multi-stream heat exchanger including a first portion 82 that includes a first coolant passage 86 for flow of hydraulic fluid into thermal communication with a first hot flow passage 90. The first hot flow passage 90 receives lubricant flow through a first inlet 124. A hydraulic fluid inlet passage 98 provides hydraulic fluid flow to the first coolant passage 86.

The example heat exchanger 78 includes a second portion 84 that includes a second coolant passage 88 for flow of fuel in thermal communication with a second hot flow passage 92. The second hot flow passage 92 receives lubricant flow through a second inlet 126. A fuel inlet passage 102 communicates fuel to the second coolant passage 88. The passages 86, 88, 90 and 92 are all disposed within a common housing 80.

A bypass passage 112 is provided to route lubricant around the heat exchanger 78 during operating conditions where cooling of the lubricant is not required.

Lubricant flow is generated by at least one pump that is schematically shown at 106 that draws lubricant from a lubricant supply 76. It should be appreciated that the lubricant system 68 may include several pumps and reservoirs to provide lubricant flow to various locations of the engine 20. In this example, lubricant exiting the heat exchanger 78 is routed to the various engine bearing systems 38 along with the fan drive gear system 48.

A first valve 108 is provided prior to the inlets 124, 126 to direct lubricant flow to one of the first portion 82 and the second portion 84 depending on the cooling need of the lubricant according to the current engine operating condition. A temperature sensor 114 is disposed within an inlet passage 94 prior to the first valve 108. A second temperature sensor 116 is provided within an exit passage 96 downstream of the heat exchanger 78 and before a second valve 110. A bypass temperature sensor 122 is provided downstream of the first valve 108 and before a second valve 110. The information from the lubricant temperature sensors 114, 116 and 122 is communicated to a controller 25.

A fuel temperature sensor 118 is disposed in a fuel outlet passage 104 and a hydraulic fluid temperature sensor 120 is disposed in a hydraulic fluid outlet passage 100. The sensors 118 and 120 are also in communication with the controller 25. In this example, the fuel temperature sensor 118 and the hydraulic fluid temperature sensor 120 both measure a temperature of respective fluids exiting the heat exchanger 78.

The controller 25 may be a separate controller for the thermal management system 62 or part of the overall engine or aircraft controller (Electronic Engine Control-EEC/Full Authority Digital Engine Control-FADEC). The controller 25 as referred to in this disclosure may be a hardware device for executing software, particularly software stored in memory. The controller may include a processor. The processor may be custom made or a commercially available processor, a central processing unit (CPU), an auxiliary processor among several processors associated with the computing device, a semiconductor based microprocessor (in the form of a microchip or chip set) or generally any device for executing software instructions.

The controller 25 will include a memory that can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Fuel and hydraulic fluid are communicated to the heat exchanger 78 and are selectively placed in thermal communication with the lubricant flow. During engine operation, each of the fuel, hydraulic fluid, and the lubricant will vary in temperature and thereby the capability of each of the hydraulic fluid and the fuel to absorb heat varies during engine operation. The first valve 108 is operated by the controller 25 to route lubricant flow into each of the first portion 82 and the second portion 84 of the heat exchanger 78 as needed to cool and maintain the lubricant within predefined temperature ranges.

The controller 25 utilizes the measured temperatures of fuel, hydraulic fluid, and lubricant to determine what proportion of lubricant should be routed through each of the first and second heat exchanger portions 82, 84. In one condition, all lubricant flow may be directed through the first portion 82 to exclusively transmit heat into the hydraulic fluid. In another condition, all lubricant flow is routed through the second heat exchanger portion 84 to exclusively transmit heat into the fuel. In yet another condition, a portion of lubricant is directed into the first portion 82 of the heat exchanger 78, and another portion is directed into the second portion 84 to transfer heat into both the hydraulic fluid and the fuel. The controller 25 may also direct some portion of lubricant flow through the bypass passage 112 to avoid the heat exchanger 78. The example first valve 108 is a three-way proportional valve that may be one single valve or a system of valves controlled by the controller 25.

Upon exiting the heat exchanger 78, the second control valve 110 routes lubricant to various locations in the core engine such as the fan drive gear system 48 and the engine shaft bearing systems 38 as needed.

The example engine 20 includes an integrated drive generator (IDG) 72 that uses a second lubricant flow that in this example is separate from the primary lubricant flow that is routed through the heat exchanger 78. The second lubricant flow may be a portion of the primary lubricant flow routed from another location. In one disclosed example, the IDG 72 routes lubricant flow through an IDG cooler 74 that places the secondary lubricant flow in thermal communication with the primary lubricant flow such that the primary lubricant flow accepts heat from the secondary lubricant flow. It should appreciated that the cooled primary lubricant could be utilized as a heat sink to other components and flows in the engine.

Both the hydraulic fluid and the fuel benefit from absorbing heat from the lubricant in the lubricant system. Heated fuel creates a more efficient combustion and thereby increases engine efficiencies. Heated hydraulic fluid aids in operation and balance against exposure to extreme cold of ambient conditions during aircraft operation.

Figure 3:
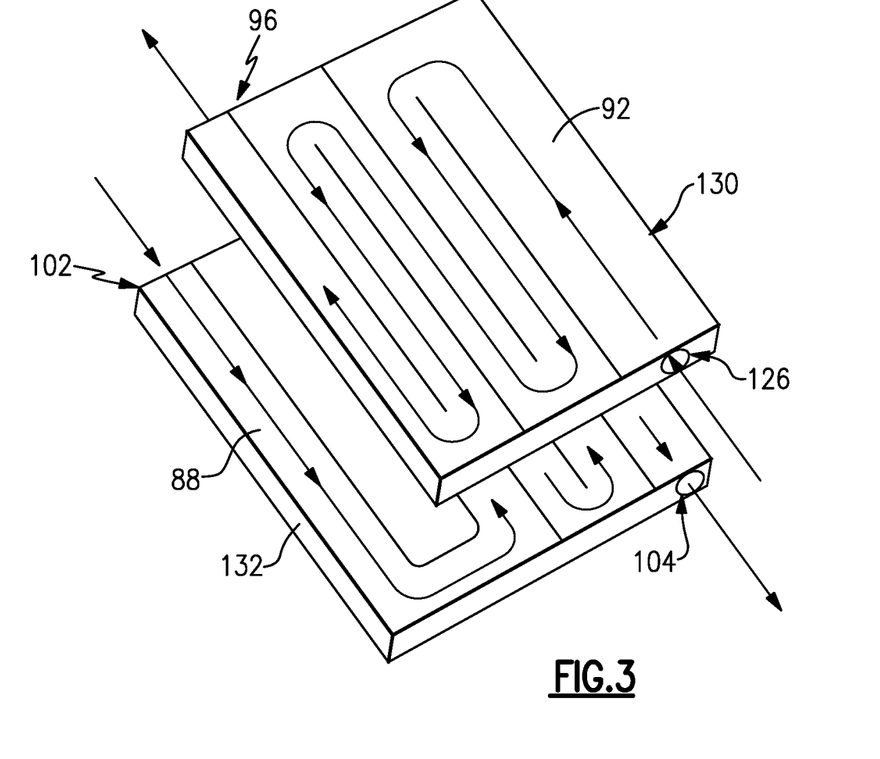
FIG. 3 is a schematic view of example plates of a disclosed heat exchanger embodiment.
Figure 4:
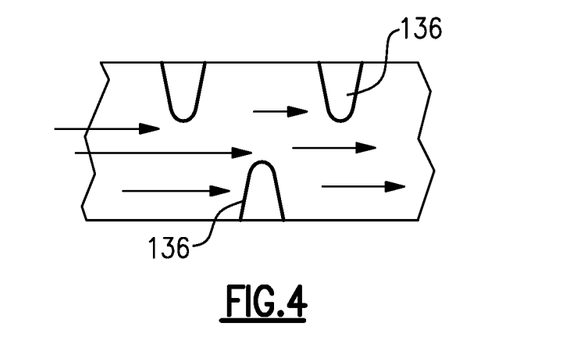
FIG. 4 is schematic view of an example passage including fins for the disclosed heat exchanger embodiment.

Referring to FIGS. 3 and 4 with continued reference to FIG. 2, the example heat exchanger 78 is a plate fine heat exchanger that includes a plurality of staked plates that enable scaling of the heat exchanger 78 to accommodate application specific requirements. A first plate 130 includes the passages 92 for the lubricant defined between the inlet 126 and the outlet 96. A second plate 132 defines the passages 88 for the fuel flow between the inlet 102 and the outlet 104. The plates 130, 132 orient the passages 92, 88 to provide a counter flow to improve thermal transfer performance. Each of the passages 88, 92 can include a fins 136. The fins 136 can be integrally formed with each of the plates 130 and 132 or can be added as additional structures to augment heat transfer.

The first and second coolant passages are disposed to provide counter flows of coolant medium (hydraulic fluid, fuel) and the lubricant. Moreover, only a few passages for the hydraulic fluid, fuel, and lubricant are shown by way of example, however, many different passages may be arranged to tailor thermal transfer capabilities. Additionally, the example heat exchanger is shown schematically with the first portion be disposed adjacent the bypass duct 15 and the second portion 84 spaced apart from the bypass duct 15. However, the first portion 82 and the second portion 84 of the heat exchanger 78 could be oriented side by side such that both the first and second portion 82, 84 are adjacent the bypass duct 15. Additionally, the heat exchanger 78 is shown schematically in cross-section at one circumferential location. However, the heat exchanger 78 may extend circumferentially about the engine axis in the core cowling 14, either in a continuous or segmented orientation.

In operation, the example thermal management system 62 measures temperatures at various points to obtain temperature information regarding the hydraulic fluid, the fuel, and the lubricant. The measured information is provided to the controller 25. The controller 25 operates the valve 108 to distribute lubricant flow between the first and second portions 82, 84 of the heat exchanger 78 depending on the relative temperatures of the hydraulic fluid flow and the fuel flow in view of lubricant temperatures. The controller 25 operates the valve 108 to distribute lubricant flow between the first coolant passage, the second coolant passage and the bypass to maintain the lubricant within a predefined temperature range. The controller 25 may proportion lubricant flow based on the measured temperatures of the hydraulic fluid and the fuel. In certain engine operating conditions, the heat acceptance capability of the fuel may be reduced and thereby more or all of the lubricant is cooled by hydraulic fluid from the hydraulic system 64. In other engine operating conditions, the fuel may be capable of accepting all the thermal energy from the lubricant and thereby the first valve 108 would route all lubricant into thermal communication with the fuel flow. In yet other engine operating conditions, the lubricant may not need to be cooled at all, thereby the first valve 108 would route all lubricant in the lubricant bypass passage 112.

Accordingly, the example thermal management system includes a multi-stream heat exchanger 78 that enables proportioning of heat loads between a hydraulic system and fuel system to increase overall heat load capabilities of said thermal management system.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A thermal management system for a gas turbine engine comprising:
   a heat exchanger including a first coolant passage for a first coolant medium, a second coolant passage for a second coolant medium that is different than the first coolant medium, a first hot flow passage in thermal communication with the first coolant passage and a second hot flow passage in thermal communication with the second coolant passage all defined within a common housing;
   a first valve controlling a flow of a first lubricant into at least one of the first hot flow passage or the second hot flow passage; and
   a controller configured to operate the first valve to direct the flow of hot medium into one of the first hot flow passage and the second hot flow passage for transferring thermal energy from the flow of hot medium into one of the first coolant medium and the second coolant medium; and
   a secondary cooler for cooling a second lubricant for an integrated drive generator with the first lubricant cooled in the heat exchanger.

2. The thermal management system as recited in claim 1, wherein a flow of the first coolant medium and a flow of the second cooling medium is counter to a flow of the first lubricant in either the first hot flow passage and the second hot flow passage.

3. The thermal management system as recited in claim 1, including a bypass passage for routing the first lubricant around the heat exchanger and the first valve controls the flow of the first lubricant through the bypass passage.

4. The thermal management system as recited in claim 3, including a first temperature sensor communicating information indicative of a temperature of the first lubricant before entering the heat exchanger to the controller, wherein the controller operates the first valve to rout a flow of the first lubricant to at least one of the first hot flow passage, the second hot flow passage and the bypass passage depending upon a temperature of the flow of hot medium.

5. The thermal management system as recited in claim 4, including a first coolant temperature sensor communicating information indicative of a temperature of the first coolant medium to the controller and a second coolant temperature sensor communicating information indicative of a temperature of the second coolant medium to the controller, wherein the controller operates the first valve to route the first lubricant to a corresponding one of the first coolant passage and the second coolant passage and the bypass passage based on the received information indicative of the temperature of the first coolant medium and the second coolant medium.

6. The thermal management system as recited in claim 2, wherein the first coolant passage, the second coolant passage, the first hot flow passage and the second hot flow passage are defined in plates that are stackable to alternate the first coolant passage with the first hot flow passage and the second coolant passage with the second hot flow passage.

7. The thermal management system as recited in claim 6, wherein each of the plates includes internal fins to aid in thermal exchange between the first coolant medium, the second coolant medium and the first lubricant.

8. A gas turbine engine comprising:
   a fan disposed within a nacelle;
   a core engine disposed within a core cowling, wherein a bypass passage for a fan air stream is defined radially between the nacelle and the core cowl;
   a thermal management system for maintaining lubricant for components of the core engine within a defined temperature range, the thermal management system including:
     a heat exchanger mounted within the core cowling adjacent the bypass passage, the heat exchanger including a first coolant passage for a hydraulic fluid flow, a second coolant passage for a fuel flow, a first flow passage in thermal communication with the first coolant passage and a second flow passage in thermal communication with the second coolant passage all defined within a common housing;
     a first valve controlling a flow of first lubricant into at least one of the first flow passage or the second flow passage;

a controller configured to operate the first valve to direct the flow of first lubricant into one of the first flow passage and the second flow passage for transferring thermal energy from the first lubricant into one of the hydraulic fluid flow and the fuel flow; and a secondary cooler for cooling a second lubricant for an integrated drive generator with the first lubricant cooled in the heat exchanger.

9. The gas turbine engine as recited in claim 8, including a bypass passage for routing the first lubricant around the heat exchanger and the first valve controls the flow of the first lubricant through the bypass passage.

10. The gas turbine engine as recited in claim 9, including a first temperature sensor communicating information indicative of a temperature of the first lubricant before entering the heat exchanger to the controller, wherein the controller operates the first valve to route the flow of the first lubricant to at least one of the first flow passage, the second flow passage and the bypass passage depending upon a temperature of the flow of first lubricant.

11. The gas turbine engine as recited in claim 10, including a hydraulic fluid temperature sensor communicating information indicative of a temperature of the hydraulic fluid flow and a fuel temperature sensor communicating information indicative of a temperature of the fuel to the controller, wherein the controller operates the first valve to route the first lubricant to a corresponding one of the first coolant passage, the second coolant passage and the bypass passage based on the received information indicative of the temperature of the hydraulic fluid flow and the fuel flow to control a temperature of the first lubricant.

12. The gas turbine engine as recited in claim 11, wherein the first coolant passage, the second coolant passage, the first flow passage and the second flow passage are defined in plates that are stackable to alternate the first coolant passage with the first flow passage and the second coolant passage with the second flow passage.

13. The gas turbine engine as recited in claim 12, wherein each of the plates includes internal fins to aid in thermal exchange between the hydraulic fluid, the fuel and the lubricant.

14. A method of managing thermal properties of a lubricant flow for a gas turbine engine, the method comprising:

assembling a heat exchanger to include a first coolant passage for a hydraulic fluid flow, a second coolant passage for a fuel flow, a first flow passage in thermal communication with the first coolant passage and a second flow passage in thermal communication with the second coolant passage all defined within a common housing;

measuring a temperature of the hydraulic fluid flow, the fuel flow and the lubricant flow with at least one sensor assembly and communicated the measured temperature information to a controller; and operating at least one valve to rout lubricant flow into thermal communication with one of the hydraulic fluid flow in the first coolant passage and fuel flow in the second coolant passages to maintain the lubricant flow within a predefined temperature range; and routing a portion of lubricant flow exiting the heat exchanger to a secondary cooler for cooling a second lubricant low for an integrated drive generator.

15. The method as recited in claim 14, wherein the at least one valve proportionally routes the lubricant flow into each of the first coolant passage and the second coolant passage depending on the measured temperature of the hydraulic fluid flow, the fuel flow and the lubricant flow.

16. The method as recited in claim 14, including assembling the heat exchanger into a core cowling adjacent a fan air stream bypass passage.

\* \* \* \* \*